United States Patent Office 2,735,256
Patented Feb. 21, 1956

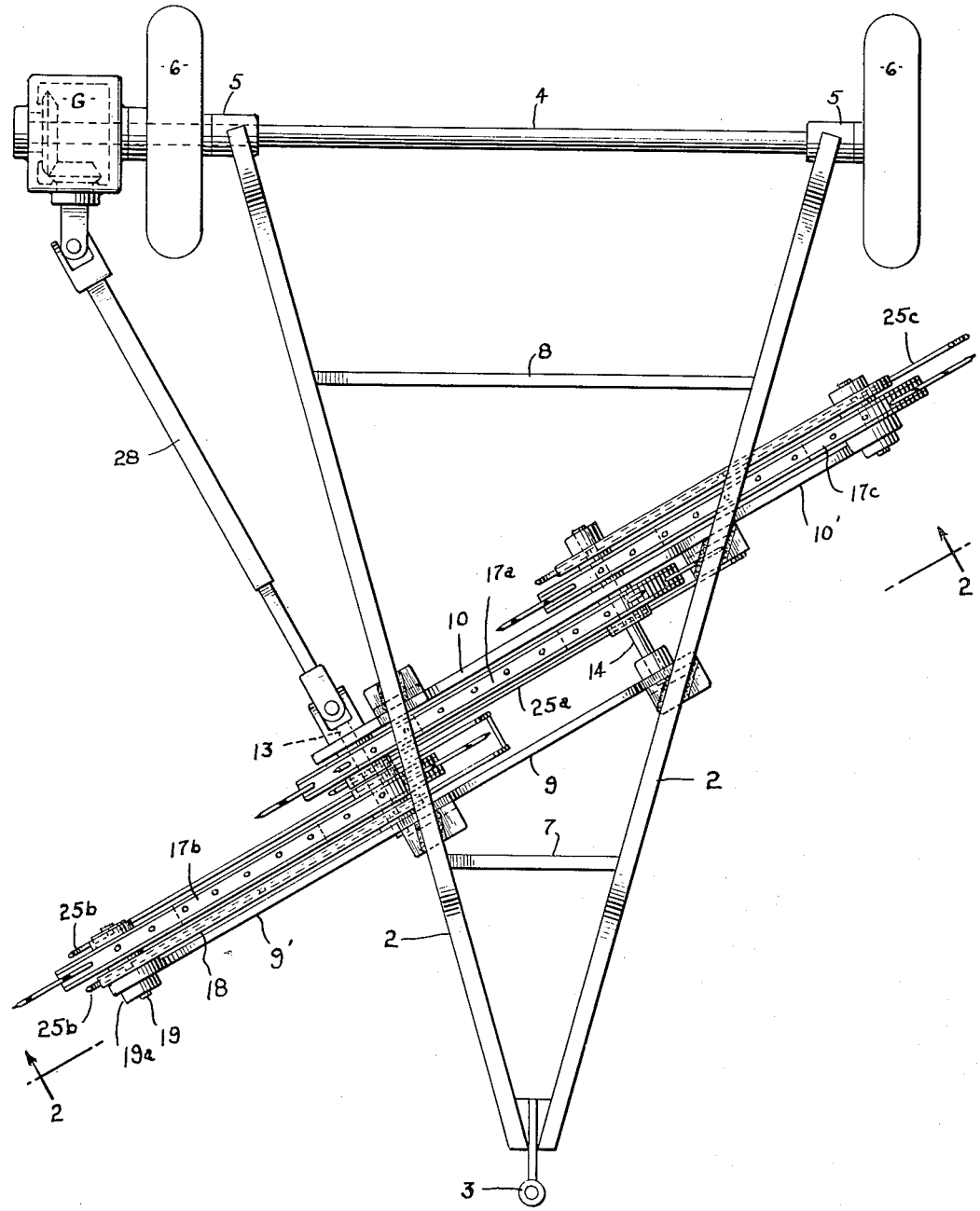

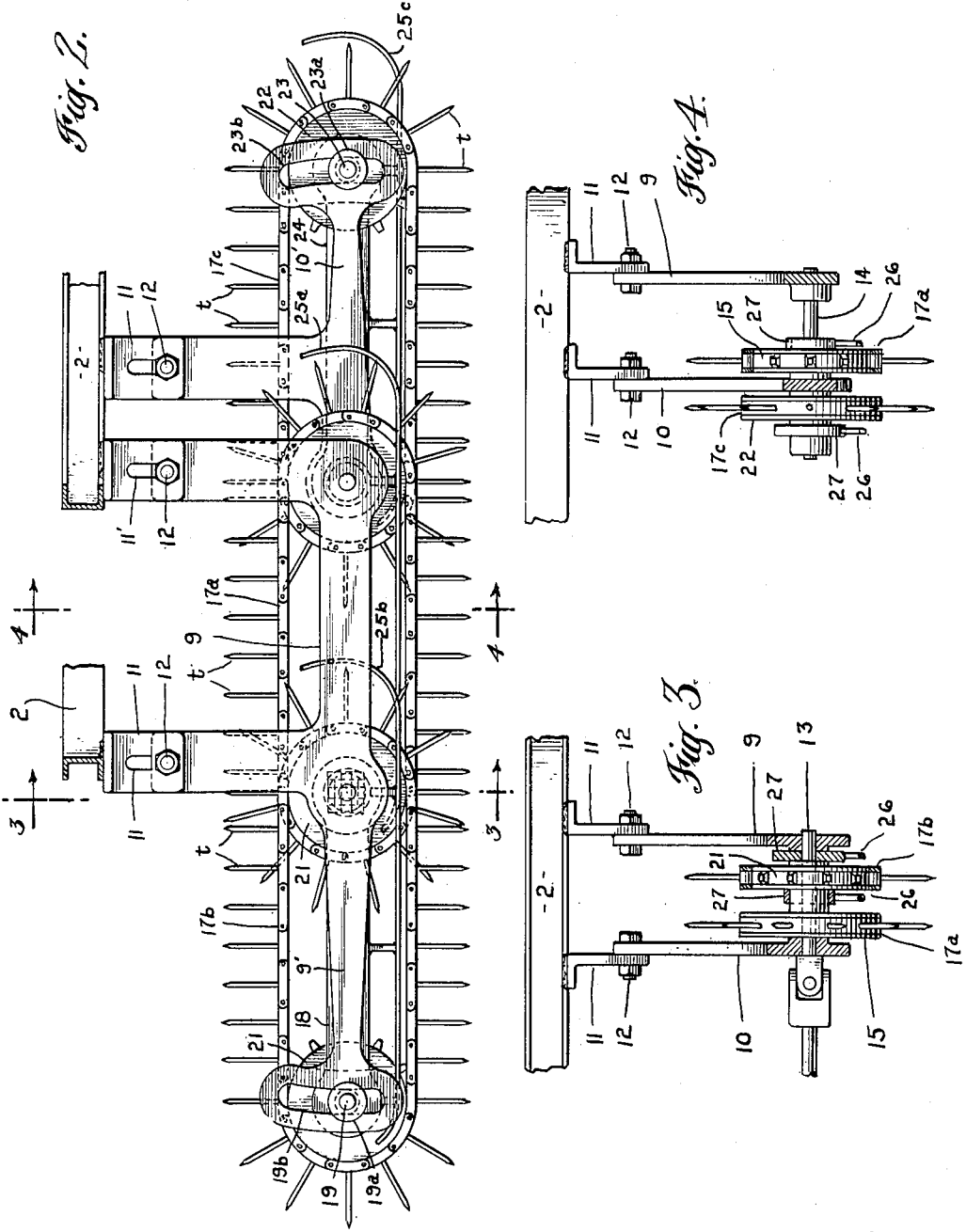

2,735,256

SIDE DELIVERY RAKE

James Rex West, New Holland, Pa., assignor, by mesne assignments, to Sperry Rand Corporation, a corporation of Delaware Application July 23, 1952, Serial No. 300,396

4 Claims. (Cl. 56—376)

This invention relates to a side delivery rake of the class in which a series of laterally moving raking elements are disposed in echelon formation to transfer the hay from one raking element to the next and to deliver it in a windrow at one side of the rake path.

Rakes of this general class are old and well known, being disclosed in prior U. S. patents, as for instance the Beck U. S. Patent 468,382 of February 9, 1892, and the Morrill U. S. Patent 2,447,354 of August 17, 1948. However, the laterally acting raking elements in these prior constructions have comprised raking wheels which due to their circular peripheries have been capable of only a limited or "point" contact with the ground or the hay.

In accordance with the present invention, it is possible to secure a uniform operative engagement of the raking elements with the hay across the entire path of traverse of the rake and thereby to improve the efficiency of the raking action, while affording a greater lateral coverage with fewer raking elements than have heretofore been required.

In accordance with my invention the raking elements comprise endless flexible chains or members arranged across the path of traverse of the rake with their lower runs disposed horizontally and in laterally overlapping relation.

Such endless raking elements are preferably disposed diagonally to the path of movement of the rake, so that if desired, they may be driven solely by engagement with the ground or the hay thereon in substantially the same manner as is disclosed in the above referred to Morrill patent. However, it is a further object of my invention to provide a power drive for such raking elements, it having been found that by driving these elements at a greater speed than is possible through ground engagement thereof, not only can a larger volume of hay be handled, but in addition this speed may be so governed as to form the hay into a windrow which is rolled to the optimum degree of compactness.

It is a further more specific object to provide a floating mounting permitting free vertical movement of the outer lateral extremities of the outermost raking elements whereby these may move in conformity with irregularities in the terrain.

The foregoing as well as additional objects and advantages will be readily apparent from the following detailed description in conjunction with the accompanying drawings in which:

Figure 1 represents a plan view of a side delivery rake illustrating a preferred embodiment of the invention;

Figure 2, a cross section on the line 2—2 of Figure 1, looking in the direction of the arrows and showing the mounting and supporting means for the several flexible raking elements;

Figure 3, a cross-section on the line 3—3 of Figure 2 looking in the direction of the arrows; and Figure 4, a cross-section on the line 4—4 of Figure 2 looking in the direction of arrows.

Referring now in detail to the accompanying drawings, the rake mechanism is supported on a frame which is adapted in any suitable manner for longitudinal ground traversing movement. The example of such a frame chosen for purpose of illustration comprises a pair of forwardly converging rigid frame members 2—2 provided at their converging forward ends with a suitable hitch 3 by which the front end of the frame may be coupled to and supported by a usual farm tractor. An axle 4 rotatably journalled across the frame on bearings 5—5 carries laterally spaced wheels 6—6 for supporting the rear end of the frame during its longitudinal forward movement. Suitable cross braces 7 and 8 also may be provided to lend rigidity to the frame structure.

In order to adapt the frame for mounting of the raking elements, there is provided a sub-frame structure which in the preferred embodiment includes the two substantially U-shaped rigid hangers 9 and 10 respectively, each including a lateral extension 9'—10' projecting from one side thereof in alignment with its bottom. The upwardly disposed legs or sides of each hanger 9 and 10 are vertically adjustably connected to brackets 11 on the respective frame members 2—2, by means of bolts 12 which are vertically adjustable in slots 11' in their respective brackets. Such adjustability permits raising or lowering of the raking elements to the desired operating level.

The hangers 9 and 10 are in parallel spaced relationship and preferably extend diagonally to the line of travel of the rake, whereby the raking elements carried by these hangers may similarly extend and move diagonally to the movement of the rake. It will be noted that the lateral extensions 9' and 10' of the respective hangers project on opposite sides of the rake structure.

Rotatably journalled through the opposed main portions of the respective hangers 9 and 10 are laterally spaced parallel shafts 13 and 14 on which are keyed sprocket wheels 15—15, both lying in a common vertical plane. Disposed around and between these sprocket wheels 15—15, and also between the hangers 9 and 10, is a flexible central raking element 17a which in the present embodiment assumes the form of an endless sprocket chain having raking teeth t secured thereon at regular intervals.

Pivoted on the shaft 13 is a vertically swingable arm 18, the outer free end of which rotatably supports a stub shaft 19 parallel to shafts 13 and 14. One end of the stub shaft 19 rotatably supports a flanged roller 19a which is movable in an arcuate slot 19b in the enlarged outer end of hanger extension 9', to thereby confine the swinging movement of the arm 19 within desired limits, the flange of the roller abutting against extension 9' to resist rearward swinging of arm 18. Sprockets 21—21 on the shafts 13 and 14 respectively and in advance of the sprockets 15—15, have a leading flexible endless raking element 17b similar to element 17a operatively supported therearound.

A trailing raking element 17c similar to the elements 17a and 17b, is arranged in rearwardly displaced relationship, but in otherwise identical manner to the leading raking element 17b, being guided around sprocket wheels 22—22 on the shafts 14 and 23 respectively rearwardly of the hanger 10. The shaft 23 is mounted at the free end of an arm 24 swingably supported on shaft 14, and a roller 23a on the shaft 23 is received and guided in an arcuate slot 23b in the enlarged outer end of hanger extension 10', so that the swinging movement of the arm 24 may be confined within desired limits.

Thus it will be seen that the outer ends of the laterally outer raking elements 17b and 17c are free to rise and fall within predetermined limits to better conform with irregular terrain.

Since the two sprocket wheels 15 and 21 on shaft 13 and the two sprocket wheels 15 and 22 on shaft 14 both rotate as a unit with their respective shafts, each of said shafts with its two sprockets may be considered simply as a single rotor, adapted to function as a common support for adjoining portions of the adjoining rake chains or elements 17a, b and c respectively. Similarly each of the sprocket wheels 21 and 22 with its supporting shaft may be regarded broadly at a rotor or rotor unit.

It will be seen that the flexible raking elements 17a, 17b and 17c are supported on these rotors or rotor units in relatively laterally overlapping echelon formation so that their lower runs jointly provide a laterally continuous raking engagement with the hay completely across the path of the rake, to thus maintain the raking action at top efficiency.

In order to efficiently strip the hay from the raking teeth t of the several raking elements as same move upwardly following completion of their operative raking run adjacent the ground, there may be provided a plurality of stripper bars 25a, 25b, and 25c, each operatively associated with its respective raking element 17a, 17b, or 17c, and each being supported by arms 26—26 from collars 27 on the respective rotor shafts.

As thus disposed, it will be apparent that the stripper bars 25b and 25c asociated with the laterally outer raking elements 17b and 17c are freed to swing or move vertically with their respective elements as the latter rise and fall during passage over uneven ground.

However, in accordance with an important feature of the invention is is desirable to furnish a power drive means for rotating the sprockets or rotors at a speed such that the transverse movement of the rake teeth over the ground may be substantially in excess of that which would normally result simply from ground engagement. This not only increases the capacity of the rake, but also enables it more efficiently to perform the desired function of rolling the hay as it passes around the upwardly moving ends of the respective raking elements 17a, b, and c in its passage across the rake. With this end in view, it is obvious that the spaces between the respective raking elements and the speed of movement of these elements may be so selected as to form a windrow which is rolled to any degree of compactness within a wide range.

The power drive shown by way of exemplification in the accompanying drawings comprises a suitable gear box G mounted on an extension of the axle 4 and secured against rotation in a suitable manner. Rotary driving movement is transmitted from the wheel 6 through the axle 4 and its associated gear box G to an extensible universal coupling 28, which is universally connected to the shaft 13 to transmit rotation thereto from the gear box G. Since all of the raking elements 17a, 17b, and 17c are interconnected through their respective sprockets and shafts, all will thus be driven simultaneously at the same rate of speed.

Therefore in operation as the portable frame is drawn over the ground by a tractor or other vehicle, the several raking elements 17a, 17b and 17c are all driven from the rotating wheels 6 by virtue of the mechanism above mentioned. The leading raking element 17b engages hay on the ground and urges it transversely of the rake into the path of the central raking element 17a, which in turn passes this hay together with the hay independently engaged by it into the path of the trailing or rearmost element 17c, which element then discharges the hay in a continuous windrow at one side of the rake.

Each time the hay is transferred from one raking element to the next, and also at the time it is discharged in windrow form form the trailing raking element 17c, it must pass around the upwardly moving rake teeth t at the discharge end of one of the raking elements, at which time it is subjected to a rolling action.

If desired the power drive means for the raking elements may be omitted, in which event the said elements may be driven simply by ground engagement in accordance with known principles; however, in such event the speed of movement of the respective raking elements will be relatively slow and it will not be possible for them to roll the hay as efficiently as when these elements are driven at a higher rate of speed by power drive mechanism.

In this application I show and describe only the preferred embodiment of the invention simply by way of explanation of its practice as by law required. However, I recognize that the invention may be embodied in other and different forms and that its several details may be modified in various ways all without departing from the invention. Therefore, the drawings and description herein are to be construed as merely illustrative in nature and not as excluding other embodiments and modifications.

Having thus described my invention, I claim:

1. A side delivery rake comprising a portable frame adapted for longitudinal movement, a plurality of rotors supported from said frame for rotation about relatively laterally spaced parallel axes diagonal to the rake movement, an endless flexible raking element supported on and movable around each pair of laterally adjacent rotors, in combination with power drive means for rotating one of said rotors whereby driven movement will be transmitted to all of said interconnected rotors and raking elements, said raking elements being disposed in relatively laterally overlapping echelon formation so that their lower runs jointly provide a laterally continuous raking action, but in spaced relation whereby as the hay passes from each of said raking elements to the next, it will move around and be rolled by an upwardly moving section of each such raking element, one of said rotors being supported for rotation about a fixed axis, a rigid arm being pivotally connected with said rotor for vertical swinging movement, and another of said rotors being carried by said arm for bodily movement about said fixed axis of rotation of said one rotor.

2. A side delivery rake comprising a portable frame adapted for longitudinal movement, a plurality of rotors supported on said frame for rotation about relatively laterally spaced parallel axes diagonal to the rake movement, an endless flexible raking element supported on and movable around each pair of laterally adjacent rotors, all but the laterally outermost of said rotors being supported on said frame for rotation about fixed axes, oppositely laterally projecting arms pivotally connected with said first mentioned rotors for movement about the axes thereof, the laterally outermost of said rotors being carried by said arms for bodily vertical movement, said raking elements being disposed in relatively laterally overlapping echelon formation so that their lower runs jointly provide a laterally continuous raking action.

3. The combination defined in claim 2, in which said frame includes rigid guide members formed with arcuate slots respectively coincident with the movement of the axes of said laterally outermost rotors, said rotors including axially concentric means movable in and limited by said slots, flanges on said means slidably abutting against said guide members and preventing longitudinal deflection of said outermost rotors.

4. The combination defined in claim 1 including a stripper bar extending between and rotatably connected to the said fixed axis rotor and the bodily movable rotor, whereby said stripper bar will be maintained at all times in operative relation to the raking element supported around said respective rotors, despite movement of said bodily movable rotor.

References Cited in the file of this patent

UNITED STATES PATENTS

| 468,382 | Beck | Feb. 9, 1892 |
| 1,406,506 | Stansberry | Feb. 14, 1922 |
| 2,511,100 | Clark | June 13, 1950 |
| 2,545,723 | Conner | Mar. 20, 1951 |

FOREIGN PATENTS

| 24,113 | Great Britain | A. D. 1902 |